United States Patent

[11] 3,607,593

[72] Inventor Dorino Semenzato
Milan, Italy
[21] Appl. No. 773,664
[22] Filed Nov. 5, 1968
[45] Patented Sept. 21, 1971
[73] Assignee Montecatini Edison S.p.A.
Milan, Italy
[32] Priority Nov. 7, 1967
[33] Italy
[31] 22394 A/67

[54] POROMERIC MATERIAL HAVING HIGH PERMEABILITY TO GASES
6 Claims, No Drawings

[52] U.S. Cl. .................................................. 161/87,
117/76, 156/78, 161/89, 161/159, 161/162, 161/166
[51] Int. Cl. ....................................................... B32b 5/22, B32b 5/32
[50] Field of Search ............................................ 117/135.5,
76 T; 156/77–78; 161/159–160, 161–162, 170–89, 83–87, DIG. 2, 168, 166; 260/2.5 P, 897 C, 41

[56] References Cited

UNITED STATES PATENTS

| | | | | |
|---|---|---|---|---|
| 3,005,795 | 10/1961 | Busse | | 260/857 |
| 3,262,805 | 7/1966 | Aoki | | 161/DIG. 2 |
| 3,328,225 | 6/1967 | Urbanic et al. | | 161/89 |
| 3,383,337 | 5/1968 | Garling | | 161/168 |
| 3,474,051 | 10/1969 | Chappelear | | 260/17 |

*Primary Examiner*—Robert F. Burnett
*Assistant Examiner*—James J. Bell
*Attorney*—Hubbell, Cohen & Stiefel

ABSTRACT: Poromeric material that is impermeable to water but permeable to gases such as air and water vapor. Material comprises a backing fabric, a first foamed layer of a vinyl polymer containing another polymeric material incompatible therewith, this first layer being bonded to the fabric, and a second layer similar to the first layer and bonded thereto, the second layer being foamed less than the first layer.

POROMERIC MATERIAL HAVING HIGH PERMEABILITY TO GASES

BACKGROUND OF THE INVENTION

1. Field of the Invention

The present invention relates to a poromeric material and a method of its preparation, which poromeric material exhibits considerable permeability to gases but is impermeable to water, and further relates to manufactured articles derived from such poromeric material.

2. Description of the Prior Art

It is known that materials can be prepared having properties similar to those of leather, and being termed "synthetic leathers," by commencing with foamed polyurethanes and various fibers, in particular, polyester fibers. Leathers of this kind are known by trademarks such as "Corfam," "Ortyx," and the like. It is also known that the vinyl chloride polymers and copolymers find application in the preparation of artificial leather which can be used in leather goods, footwear, upholstery, and the like.

SUMMARY OF THE INVENTION

I have now surprisingly found that it is possible to obtain a poromeric material characterized by a high permeability to gases, (e.g., air, water vapor), while at the same time being impermeable to water. Essentially, my poromeric material comprises a base fabric layer to which is bonded a first layer of foamed vinyl polymer. This layer containing another polymeric material that is incompatible with the vinyl polymer, e.g., polypropylene, and a second layer similar to the first layer and bonded thereto, such second layer being foamed to a lesser degree than the first layer.

DESCRIPTION OF PREFERRED EMBODIMENTS

My method comprises coating a fabric backing with two layers. These two layers desirably are as follows:

1. First layer (foamed layer): a plastisol obtained from a mixture of polyvinyl chloride, a plasticizer therefor, a blowing agent, a stabilizing "kicker," a filler, and a material that is incompatible with PVC such as polypropylene in the form of "flakes" or fibers of suitable length;

2. Second layer (compact layer): a mixture of paste-forming polyvinyl chloride with a plasticizer, a stabilizing "kicker," a pigment, a blowing agent, and a material that is incompatible with PVC such as polypropylene in the form of flakes or fibers. In this second layer the blowing agent and the kicker are sued in lower percentages than are used in the first layer.

According to this invention, as a suitable polyvinyl chloride for the preparation of the mixtures both for the first as well as the second layer, a polymer is used that is prepared by emulsion polymerization, such polymer having a Fikentscher K-value of 70–80. The amount of polyvinyl chloride should be from about 30 to 70 percent by weight of the total amount of the mixture.

The plasticizer may be any of those conventionally employed for polyvinyl chloride and particularly adipates like dioctyl adipate, phthalates like dioctyl or butyl benzyl phthalate, sebacates, phosphates, phosphites and mixtures thereof; such plasticizers are employed in the compositions of both the first and second layer in amounts comprised preferably in the range of from 45 to 120 parts per hundred parts of resin.

The blowing agent for both layers may be any of those conventionally employed and which liberate gas upon heating. Suitable blowing agents include azodicarbonamide, azobisisobutyronitrile, or the like; their concentration is preferably comprised in the range from 0.01 to 4 parts per hundred parts of resin.

The "kicker" may be of greatly different nature; particularly advantageous is the use of dibasic lead phthalate or other salts, like laurates of Ca/Zn, Ba/Cd/Zn, or the like. The function of the kicker is to promote the decomposition of the blowing agent, aside from acting as stabilizer; their concentration is preferably comprised in the range from 0.01 to 4 parts per hundred parts of resin.

The filler for the first layer is preferably $TiO_2$.

The polypropylene flakes are prepared by polymerizing propylene with stereospecific catalysts and by successively separating those fractions of high granulometry, or by means of other known systems, such as for instance, by polymerization with appropriate catalysts. These flakes should have a melt index of from about 10 to 40, and preferably from about 20 to 30. The amount of polypropylene flakes (or fibers) incorporated should be from about 1 to 5 percent by weight of the total composition.

Upon varying the particle size and/or the quantity of the flakes which are added, the characteristics of the poromeric material that is obtained will also vary, and in particular, with an increase in the amount there is an increase of the transpiration of the material.

According to this invention, besides polypropylene flakes, there may also be used polypropylene fibers of very short length, up to a maximum of 1–2 mm.

In the second layer the pigment employed may be any of the conventional pigments, either organic or inorganic, generally used for chlorovinyl resins.

The backing fabric of the poromeric material may be a duck, a jersey, or a "nonwoven" web. The fibers of the fabric may be artificial (synthetic) fibers, or natural fibers, or mixtures thereof. These fibers are desirably of cotton, polyamides, cellulose and modified cellulose, wool or the like.

In the known poromeric materials the cells or cavities that are formed by the action of the blowing agent are to a great extent noncommunicating with each other. Also, the outer surfaces of the spread layer are essentially continuous films.

In the material of the present invention, on the contrary, the presence of incompatible materials, such as polypropylene flakes, results in intercommunication between the cells and also results in intercommunication between the cells and also results in the formation of pores on the surface as well as in the interior.

For preparation of the poromeric material according to this invention, one may follow a "transfer" process, according to which a temporary substrate (preferably made of "release" paper) is spread coated—preferably on continuously operating equipment of the type used for the preparation of artificial leathers—with the first layer mix, followed by heating to effect gelling of the material. Thereafter the first layer is "smeared" (spread coated) with the mix of the second layer, followed by heating. This is followed by the removal of the temporary substrate and coupling of the two layer system with a fabric.

It is preferable to submit the two layer system to a pulling stress before the coupling operation, in order to facilitate the separating of the components that are incompatible with other (PVC and flakes). The coupling is preferably carried out by lamination (rolling), desirably with the aid of a glue (previously spread on the fabric).

According to this invention, e.g., transpiration is caused by the formation of micropores that are formed following the separation of the two incompatible phases. Thus, the poromeric materials according to this invention, instead of being obtained from polypropylene materials (flakes or fibers), may also be obtained by using other polymeric materials that are incompatible with the chlorovinyl resin. Such materials include other polyolefins such as, e.g., polyethylene, ethylene/propylene copolymers, epoxy resins, consisting of polycondensed diglycidil ethers of dihydric phenols.

The following examples are given for further illustrating the invention.

Example 1

On a device for the preparation of artificial leathers a release paper substrate was spread coated with a plastisol consisting of (layer 1 compact thickness 150 microns):

| | |
|---|---|
| PVC, paste making resin with a K-value = 72 | 100 parts (by weight) |
| dioctyl phthalate | 55 parts (by weight) |
| azodicarbonamide (blowing agent) | 0.3 parts (by weight) |
| Ba/Cd laurate | 2 parts (by weight) |
| polypropylene flakes (having a melt index of 20 and a particle size of 100–130 microns) | 2 parts (by weight) |
| carbon black | 1 part (by weight) |

The whole was passed into an oven at 150° C., and kept there for 1–2 minutes. Thereafter, onto the previous layer a second layer (foamed) was spread, which consisted of:

| | |
|---|---|
| PVC, paste making resin, having a K-value of 72 | 100 parts (by weight) |
| dioctyl phthalate | 80 parts (by weight) |
| azodicarbonamide | 2 parts (by weight) |
| dibasic lead phthalate (stabilizing kicker) | 2 parts (by weight) |
| $TiO_2$ | 5 parts (by weight) |
| polypropylene flakes | 5 parts (by weight) |

The initial thickness of this layer was 200 microns.

The whole was then passed into an oven at 200° C. and kept there for 1–2 minutes. The release paper was then removed. The system was then subjected to a slight tension in order to facilitate the separation of those components that were incompatible with each other; then the system was coupled to a cotton jersey fabric (with the second layer adjacent to the fabric), after preliminarily having spread on the fabric some plastisol of the first layer which served as a binder. Said coupling occurred in about 1 minute in an oven heated to 150–170° C.

The poromeric material thus obtained showed the following air transpiration rates:

| Pressure (mm. Hg) | $cm.^3$ of air Hr. $cm.^2$ |
|---|---|
| 20 | 8.7 |
| 40 | 113 |
| 60 | 175 |
| 100 | 260 |
| 150 | 315 |

A material prepared in a similar fashion, but without the presence of polypropylene flakes, did not allow any passage of air.

Example 2

On a device for the preparation of artificial leather a substrate of release paper was spread coated with a plastisol consisting of (layer 1, compact):

| | |
|---|---|
| PVC, paste making resin, with a K-value of 80 | 100 parts (by weight) |
| dioctyl adipate | 50 parts (by weight) |
| azodicarbonamide (blowing agent) | 0.3 part (by weight) |
| Ba/Cd laurate | 2 parts (by weight) |
| carbon black | 1 part (by weight) |
| polypropylene flakes, with a melt index = 20 and particle size = 100–120 microns | 2 parts (by weight) |

The whole was then passed into an oven at 150° C. for 1–2 minutes. Thereafter a second layer was spread, which consisted of:

| | |
|---|---|
| PVC, paste making resin with a K-value of 80 | 100 parts (by weight) |
| dioctyl adipate | 80 parts (by weight) |
| azodicarbonamide | 2 parts (by weight) |
| dibasic lead phthalate | 2 parts (by weight) |
| $TiO_2$ | 15 parts (by weight) |
| polypropylene flakes | 4 parts (by weight) |

The whole was then passed into an oven at 200° C. for 1–2 minutes.

The release paper was then removed and the system was subjected to a slight tension and subsequently was coupled to a jersey fabric made of polyamide fibers, the second layer being adjacent to the fabric after preliminary having spread on the fabric some plastisol of the first layer which serves as a binder.

The poromeric material thus obtained shows the following air transpiration rates:

| Pressure (mm.Hg) | $cm.^3$ of air hr. $cm.^2$ |
|---|---|
| 20 | 2.0 |
| 40 | 80 |
| 60 | 121 |
| 100 | 205 |
| 150 | 270 |

Example 3

On a device for the preparation of artificial leather substrate of release paper was spread coated with a plastisol consisting of (layer 1, compact):

| | |
|---|---|
| PVC, paste making resin with a K-value = 70 | 100 parts (by weight) |
| dioctyl phthalate | 55 parts (by weight) |
| azodicarbonamide (blowing agent) | 0.3 part (by weight) |
| Ba/Cd laurate | 2 parts (by weight) |
| carbon black | 1 part (by weight) |
| polypropylene fibers having a melt index of 20, prepared by melt-spinning followed by a stretching, with a denier of 2 d.p.f., and a cut length of 1 mm. | 1 part (by weight) |

The whole was then passed into an oven at 150° C. for 1–2 minutes. Subsequently a second layer was spread, consisting of:

| | |
|---|---|
| PVC, paste making resin with a K-value = 10 | 100 parts (by weight) |
| dioctyl phthalate | 75 parts (by weight) |
| azodicarbonamide (blowing agent) | 2 parts (by weight) |
| dibasic lead phthalate | 2 parts (by weight) |
| $TiO_2$ | 10 parts (by weight) |
| polypropylene fibers | 3 parts (by weight) |

The whole was then passed into an oven at 200° C., for 1–2 minutes.

Thereafter the release paper was removed and the system was subjected to a slight tension, after which it was coupled to a cotton jersey fabric, the second layer being adjacent to the fabric.

The poromeric material thus obtained showed the following air transpiration rates:

| Pressure (mm. Hg) | $cm.^3$ of air hr. $cm.^2$ |
|---|---|
| 20 | 1.0 |
| 40 | 60 |
| 60 | 105 |
| 100 | 170 |
| 150 | 230 |

Variations and changes may be made without departing from the spirit of this invention.

Having thus described my invention, what I claim by Letters Patent is:

1. A poromeric material that is impermeable to water but which has a high permeability to air and water vapor, said material being suitable for use as synthetic leather, said material comprising (1) a backing fabric, (2) a first foamed layer secured to said fabric, said first layer comprising a mixture of vinyl chloride polymer and a polymeric material incompatible therewith, and (3) a second foamed layer secured to said first foamed layer, said second layer comprising a mixture of a vinyl chloride polymer and a polymeric material incompatible therewith, said vinyl chloride polymer being present as a continuous phase and said polymeric material being in the form of flakes or short fibers, said second foamed layer being foamed less than said first foamed layer.

2. The product of claim 1 wherein said polymeric material in each of said layers is polypropylene.

3. The product of claim 2, wherein the backing fabric is jersey, duck, or nonwoven fabric, and is made of cotton, cellulose, modified cellulose, wool, or synthetic polyamides.

4. The product of claim 3 wherein the amount of vinyl chloride polymer present in each layer is from about 30 percent to 70 percent by weight of said layer.

5. The product of claim 4 wherein said polypropylene is in the form of flakes having a particle size of from about 50 to 200 microns.

6. The product of claim 5 wherein the amount of flakes present is from about 1 percent to 5 percent by weight of the overall layer.